United States Patent [19]

Herzog et al.

[11] 3,767,940

[45] Oct. 23, 1973

[54] VOLTAGE COMPENSATED FIRING CIRCUIT

[75] Inventors: Rollie R. Herzog; Frank A. Neusbaum, both of Danville, Ill.

[73] Assignee: General Electric Company, Indianapolis, Ind.

[22] Filed: Apr. 24, 1972

[21] Appl. No.: 246,974

[52] U.S. Cl. ..... 307/252 F, 307/252 N, 307/252 Q, 307/252 W, 323/22 SC, 323/38

[51] Int. Cl. ........................................... H03k 17/72

[58] Field of Search .................... 307/252 F, 252 N, 307/252 Q, 252 W, 252 J, 252 K; 323/22 SC, 38

[56] References Cited

UNITED STATES PATENTS 3,633,047 1/1972 Kadah et al. .................... 307/252 F

OTHER PUBLICATIONS

Electronics, October 26, October 26, 1970, pg. 87, "Voltage Monitor Is Easy On Both Battery And Budget" by W.G.S. Brown et al.

G. E. Application Note 90.70 11/67 "The D13T–A Programmable Unijunction Transistor" by W. R. Spofford, Jr. pg.10

*Primary Examiner*—John Zazworsky
*Attorney*—John M. Stoudt et al.

[57] ABSTRACT

A firing circuit for firing a number of controlled rectifiers in which there are a number of slave controlled rectifiers, each of which is associated with a storage capacitor for firing the slave controlled rectifier upon discharge of the storage capacitors. A master controlled rectifier is connected in circuit with the storage capacitors for discharging the storage capacitors to fire the slave controlled rectifiers upon firing of the master controlled rectifier. There is a timing circuit including a programmable unijunction transistor which conducts when its anode voltage exceeds its gate voltage by more than its junction voltage drop. The gate of the programmable unijunction transistor has a selectively variable connection to a voltage divider circuit, which, in turn, is connected in circuit across the pulsating potential source. A first Zener diode is connected in circuit across the pulsating potential source and a resistance-capacitance circuit is connected across the Zener diode. The anode of the programmable unijunction transistor is connected to the charging circuit. The gate of the master controlled rectifier is connected to the cathode of the programmable unijunction transistor for firing the master controlled rectifier, and thus the slave controlled rectifiers, upon conduction of the unijunction transistor. The voltage divider circuit, in one form includes a second Zener diode, having a lower regulating voltage than the first Zener diode, for providing a regulated voltage to the programmable unijunction gate. In another version, the voltage divider circuit is connected to the first Zener diode through a dropping resistance for providing the gate of the programmable unijunction transistor with a regulated voltage.

14 Claims, 4 Drawing Figures

VOLTAGE COMPENSATED FIRING CIRCUIT

BACKGROUND OF THE INVENTION

This invention relates to improved voltage compensated firing circuits. More particularly it releates to improved voltage compensated firing circuits which are useful for phase controlling power to an inductive load. Circuits incorporating the present invention find particular usefulness in dimming systems for fluorescent lamps.

The present invention is an improvement of the invention of U.S. Pat. No. 3,323,014 issued to Thomas G. West on May 30, 1967 and assigned to General Electric Co., assignee of the present invention; which patent is specifically incorporated herein by reference.

The aforementioned West patent illustrates and describes circuits for controlling a plurality of solid state control devices. These circuits enable a number of slave controlled devices to be fired by a master controlled device so that one or more loads connected to the slave controlled devices may be uniformly controlled by use of one master firing circuit. With such an arrangement each of the controlled devices is required to handle only a relatively small amount of power. This enables the overall control to be built from relatively inexpensive components. Additionally the control dissipates fairly small amounts of energy so that attendant problems such as heating are minimized.

In manufacturing such controls in commercially significant numbers it is desirable to use as inexpensive components as possible in order to minimize the cost of the controls. Such components, even resistors, have fairly substantial variations from their nominal values. Also the relaxation oscillator in the master control of the circuits of the West patent incorporates a unijunction transistor. The conduction of such devices is a function of their intrinsic standoff ratio. This ratio varies from device to device, generally within a range between 0.5 and 0.7. This means there is as much as a 30 – 50 percent variation in the firing voltage. For all these reasons it may be desirable in the circuits of the type set forth in the West patent to include trimming resistors so that each of the master control circuits will respond in essentially a similar fashion to input voltage and master control setting.

Additionally, the actual supply voltage with which the control is used may cause a difference in firing characteristics of the control circuit. When such circuits are used as diming controls for fluorescent lamps such a variation in the supply voltage will cause a variation in the light output characteristics of the load. Therefore, trimming resistors also may be utilized to field adjust the control for operation with the actual voltage available at an individual installation. Such field adjustment is bothersome and may cause problems as the user may not fully understand the function of the trimming resistors.

Thus it is desirable to provide control circuits for firing a plurality of solid state control devices which may incorporate relatively inexpensive components having substantial variations from their nominal characteristics without requiring the use of adjustable elements for trimming; or at least where such elements need be adjusted only at the time of manufacture in order to provide optimum operation. Also, it is desirable to provide improved control circuits of this type which compensate for variations in the supply voltage from the nominal voltage for which the control is designed.

One problem which can be encountered when using controls of this general type for fluorescent lamp dimming installations is light flicker. Such circuits phase control the power to the fluorescent lamps. The master controlled rectifier is gated to provide power to the lamps when the unijunction transistor conducts. The unijunction transistor will always conduct at least near the end of each half cycle or pulse of the supply potential so that at the end of each half cycle the control rectifiers are turned on. Depending on the light setting, the unijunction transistor again may conduct and provide a gate or turn on signal to the controlled rectifiers relatively early in the next pulse of supply power. With fluorescent lamp loads the current through the load, and thus the current through the slave controlled rectifiers, lags the supply voltage. If the turn-on signal in a subsequent pulse of the supply power occurs before the current in the load has dropped to essentially zero from the previous pulse the slave control devices will still be conducting. They will then turn off as soon as the lagging load current passes through zero. When this occurs they may not be triggered again until essentially the end of the pulse of supply potential. Practically speaking, the load is not provided any power supply during that pulse. Since the lamps are essentially off during that pulse the slave rectifiers will turn on early in the next pulse and conduct for most of the pulse to provide a relatively large amount of energy to the lamps. This causes the phase angle of the voltage supplied to the lamps to vary from pulse to pulse and the lamps flicker. A change in the supply voltage level changes the power provided to the lamp which affects the degree which the lamp current lags the supply voltage and changes the point in each pulse at which the circuit tries to turn on the rectifiers. Thus a change in voltage from the designed supply voltage, particularly an excess voltage, can cause lamps to flicker.

SUMMARY OF THE INVENTION

Accordingly it is a general object of this invention to provide an improved voltage compensating firing circuit.

Another object of this invention is to provide such an improved firing circuit for supplying firing signals to a plurality of thyristors for symmetrically firing the thyristors.

It is yet another object of this invention to provide such an improved firing circuit in which the operating point is stable from circuit to circuit and requires little or not trimming.

Still another object of this invention is to provide such an improved firing circuit in which low tolerance components may be utilized to advantage.

In accordance with one form of the present invention there is provided a voltage compensating firing circuit for use in conjunction with a pulsating potential source for firing a plurality of solid state switch means. The firing circuit comprises input means for providing a pulsating potential, a master solid state switch means in the form of a controlled rectifier and plurality of slave solid state switch means in the form of slave controlled rectifiers. There are a plurality of auxiliary firing circuits, each of which includes at least one storage capacitor. Means couples each of the storage capacitors to its associated slave controlled rectifier for firing the associated controlled rectifier when that storage capacitor is discharged. Circuit means connects each of the storage capacitors with the input means for providing each of the storage capacitors with a charge and connects each of the storage capacitors in circuit across the master controlled rectifier to provide a discharge path for each of the storage capacitors. There is a timing circuit, including a programmable unijunction transistor having an anode terminal, a cathode terminal and a gate terminal. The programmable unijunction transistor conducts when its anode voltage exceeds its gate voltage by an amount greater than its junction voltage drop. A voltage divider circuit is connected to the input means. The programmable unijunction gate terminal has a selectively variable connection to the voltage divider circuit for impressing a voltage on the gate terminal. A voltage regulating device is connected in circuit across the input means for providing a regulated D.C. voltage across the voltage regulating device. A resistance-capacitance charging circuit is connected across a voltage regulating device and the unijunction anode terminal is connected to the charging circuit for impressing a voltage on the programmable unijunction anode terminal. The master controlled rectifier has a control terminal connected in circuit with the programmable unijunction cathode terminal for firing the master controlled rectifier upon conduction of the programmable unijunction.

BRIEF DESCRIPTION OF THE DRAWINGS

The subject matter which we regard as our invention is set forth in the appended claims. The invention itself, however, together with further objects and advantages thereof may be better understood by referring to the following description taken in conjunction with the accompanying drawings in which:

DESCRIPTION OF THE PREFERRED EMBODIMENTS

Figure 1:
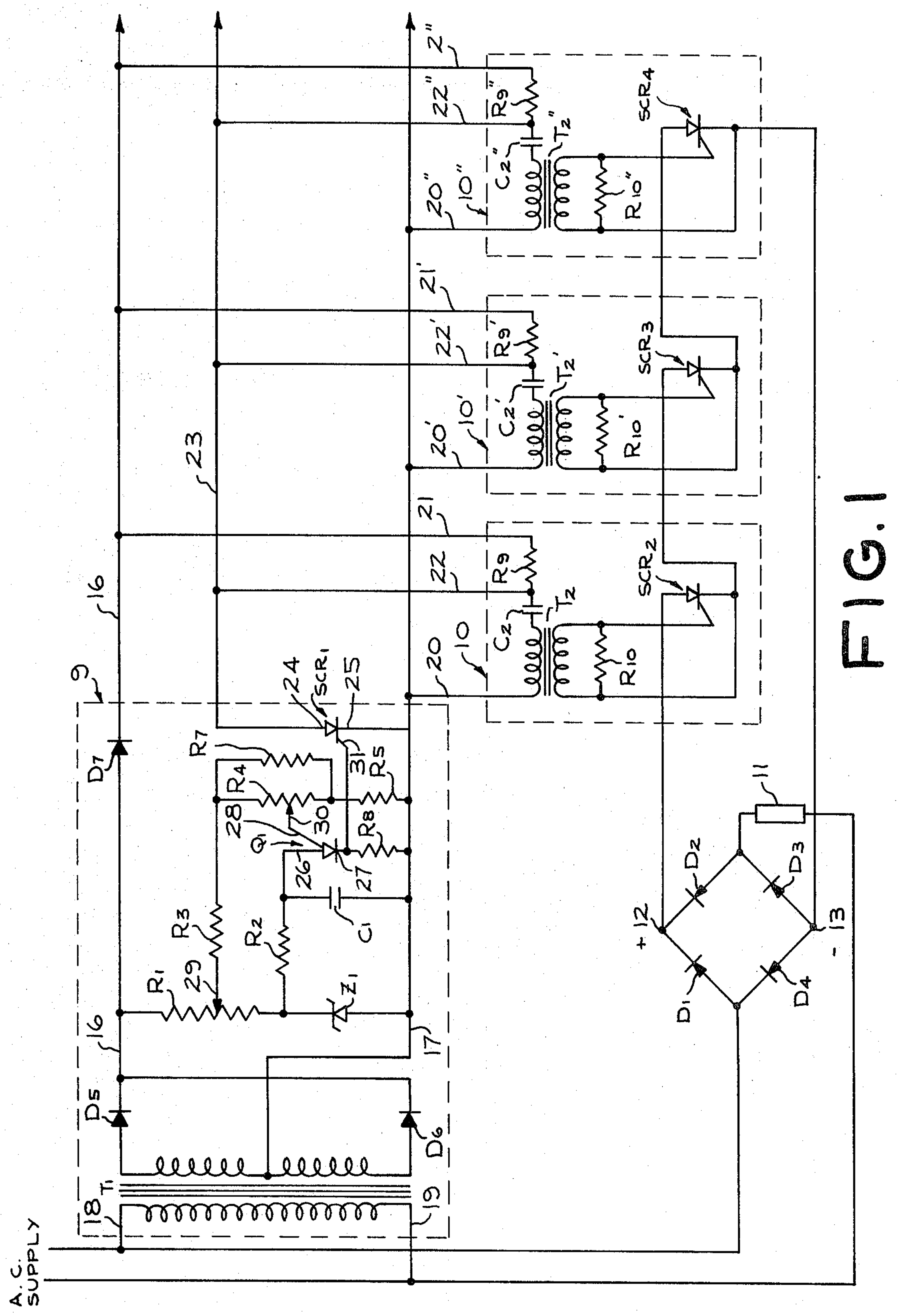
FIG. 1 is a schematic circuit diagram of one form of the present invention in which the improved firing circuit arrangement is used to fire a plurality of the solid state control devices connected in series.

Referring more particularly to FIG. 1, the firing circuit arrangement comprises a master firing circuit or timing circuit 9, which includes a master solid state switch means, in the form of a controlled rectifier $SCR_1$, and its associated firing circuit, and a plurality of auxiliary circuits 10, 10′ and 10″. The auxiliary circuits include slave solid state switch devices or controlled rectifiers $SCR_2$, $SCR_3$ and $SCR_4$ that are symmeterically fired when the master controlled rectifier $SCR_1$ is fired.

The slave control devices $SCR_2$, $SCR_3$, and $SCR_4$, are connected in a series circuit relationship with a full wave bridge rectifier 14 which includes four diodes $D_1$, $D_2$, $D_3$, $D_4$, and output terminals 12 and 13. During operation the full wave unfiltered output of the bridge rectifier 14, in conjunction with the slave controlled rectifiers function as a bidirectional switch to control the conduction angle of each half cycle of current supplied to a load 11. The aforementioned West patent illustrates and describes other exemplification circuits for using slave controlled rectifiers to control current in various loads, particularly for use as dimming controls for a large number of fluorescent lamps. For the sake of simplicity such load circuits will not be repeated herein.

Synchronization between the load circuit and the master firing circuit 9 is accomplished by energizing the firing circuit 9 and the bridge rectifier 14 from the same alternating current supply which, for purposes of illustration, conveniently may be a 120 volt 60 hertz source normally used for energizing fluorescent lamps.

The electrical potential or energy for the master firing circuit is obtained by a transformer $T_1$ which has its primary winding leads 18, 19 connected to the alternating power source. The secondary of the transformer $T_1$ is center tapped with its two end terminals joined to a supply or power lead 16 through diodes or rectifiers $D_5$ and $D_6$ and its center tap joined to a supply or power lead 17. Thus a rectified, pulsating DC potential is provided between the leads 16–17, which serve as an input means for the master control firing circuit 9.

Each of the auxiliary circuits 10, 10′ and 10″ includes a series circuit comprising the primary of transformers $T_2$, $T_2'$, and $T_2''$, storage capacitors $C_2$, $C_2'$ and $C_2''$ and resistances $R_9$ $R_9'$ and $R_9''$, respectively. The transformer primaries are connected through leads 20, 20′ and 20″ to the supply lead 17. The resistances $R_9$, $R_9'$ and $R_9''$ are connected through leads 21, 21′ and 21″ to supply lead 16. The junctions between the storage capacitors $C_2$, $C_2'$ and $C_2''$ and their associated resistances $R_9$, $R_9'$ and $R_9''$ are connected through leads 22, 22′ and 22″ to the lead 23. The lead 23 is connected to the anode 24 of master controlled rectifier $SCR_1$, whose cathode 25 is connected to the supply lead 17. With this arrangement the series circuits (including the storage capacitors $C_2$, $C_2'$ and $C_2''$) are connected between the power supply leads 16–17 so that a charge will build up on the storage capacitors. Additionally each of the storage capacitors and its associated transformer primary are connected in a loop through the anode-cathode path of master controlled rectifier $SCR_1$ to discharge the storage capacitors $C_2$, $C_2'$ and $C_2''$ when the master controlled rectifier conducts. A rectifier or a diode $D_7$ is connected in the power supply lead 16 to prevent the voltage across the capacitors $C_2$, $C_2'$ and $C_2''$ from being reflected back into the master control circuit 9.

Referring now to the master firing circuit 9 in more detail, it will be seen that the master firing circuit is a timing circuit or relaxation oscillator incorporating a programmable unijunction transistor $Q_1$ having an anode terminal 26, a cathode terminal 27 and a gate terminal 28. A voltage regulating device, in the form of a Zener diode $Z_1$ in the exemplification, is connected in series with a dropping resistance $R_1$ across the input leads 16–17. In the exemplification resistance $R_1$ is a variable resistance having an intermediate tap indicated by arrow 29. A voltage divider circuit consisting of serially connected resistances $R_3$, $R_4$, and $R_5$, is connected between the intermediate tap 29 and power supply lead 17. An additional resistance $R_7$ is connected in parallel with the resistance $R_4$. Resistance $R_4$ is a variable resistance having an intermediate tap 30 which is connected to the programmable unijunction gate terminal 28. A charging circuit, including resistor $R_2$ and capacitor $C_1$ is connected across the Zener diode $Z_1$, between its connection with resistor $R_1$ and power lead 17. The anode terminal 26 of the programmable unijunction $Q_1$ is connected to the junction between resistor $R_2$ and capacitor $C_1$. The cathode terminal 27 of the programmable unijunction $Q_1$ is connected to the power lead 17 through a resistor $R_8$.

A programmable unijunction transistor has substantially different operating characteristics than a unijunction transistor in that a programmable unijunction transistor will conduct when its anode voltage exceeds its gate voltage by an amount greater than its junction drop voltage. They do not have the variable intrinsic standoff ratio characteristic that is found in unijunction transistors. The master firing circuit 9 takes advantage of this to provide a firing circuit which will function in a manner similar to that of the aforementioned West patent and yet greatly reduces the possible need of potentiometers or trimming resistors even with low tolerance components. The main firing circuit of the present invention, as exemplified in FIG. 1 also compensates for variations in the supply voltage.

In operation, a pulsating DC voltage appears across the supply leads 16–17. The voltage regulating device, in the form of Zener diode $Z_1$, provides a regulated voltage, less than the maximum supply voltage. This regulated voltage is impressed on the charging circuit to build a charge on the capacitor $C_1$. The $C_1$ voltage is in effect, the anode voltage of programmable unijunction transistor $Q_1$. A voltage divider circuit extends from lead 16 through a portion of resistance $R_1$ to intermediate terminal 29, resistance $R_3$, the parallel arrangement of resistances $R_4$ and $R_7$, and resistance $R_5$ to supply lead 17. The voltage divider circuit provides a voltage, which is a percentage of the instantaneous supply voltage determined by the relative size of the resistances, at the intermediate tap 30 of resistance $R_4$. This voltage is effectively the gate voltage of the programmable unijunction transistor $Q_1$. When the voltage on capacitor $C_1$ exceeds the voltage at tap 30 the programmable unijunction transistor will conduct and current will flow from its cathode 27 through resistance $R_8$ to supply lead 17. The gate of the controlled rectifier $SCR_1$ is connected in circuit with the cathode 27 of the programmable unijunction transistor $Q_1$. When the programmable unijunction transistor conducts a signal is fed to the gate 31 of $SCR_1$ to fire the $SCR_1$.

As power is being supplied to the master firing circuit 9 a pulsating DC potential also is provided to the storage capacitors $C_2$, $C_2'$ and $C_2''$ through leads, 20, 21, 20′, 21′, and 20″ and 21″ so that a charge is built up on each of the storage capacitors. When the master controlled rectifier $SCR_1$ is gated a discharge circuit for each of the storage capacitors $C_2$, $C_2'$, and $C_2''$ is completed through the master controlled rectifier $SCR_1$ and the primary of transformers $T_2$, $T_2'$ and $T_2''$ respectively. One side of the secondary of each of the auxiliary transformer secondaries is connected to the cathode of the associated slave controlled rectifier. When the storage capacitors $C_2$, $C_2'$ and $C_2''$ discharge through the primary of the transformers $T_2$, $T_2'$ and $T_2''$ a gating pulse is applied to the gate of the controlled rectifiers $SCR_2$, $SCR_3$, and $SCR_4$, to turn them on so that energy is applied to the load 11. The resistances $R_{10}$, $R_{10}'$ and $R_{10}''$ are connected across the auxiliary transformer secondaries to insure that a proper maintaining current is provided to the slave controlled rectifiers.

The resistance $R_3$ provides a voltage drop before resistance $R_4$ and, by varying resistance $R_3$, how late in each half cycle or pulse of DC energy the programmable unijunction $Q_1$ will turn on can be limited. The later in the half cycle it turns on the lower the power and, in a fluorescent lamp control, the lower the light level. The resistance $R_5$, occurring after the resistance $R_4$, provides a minimum voltage level at the programmable unijunction gate 28 and thus controls the earliest time in each half cycle that the programmable unijunction will turn on. In a fluorescent lamp control this limits the maximum amount of light. The resistance $R_4$ is selectively variable by movement of the tap 30 and functions as an intensity selector for a lighting system or power selector for another load. Within the limitations determined by the other resistances its setting determines the point within each pulse or half cycle when the programmable unijunction will turn on and thus controls the power to the load. The resistance $R_7$ in parallel with the resistance $R_4$ provides a more sensitive control. The selectively variable connection of the programmable unijunction gate terminal 28 to the voltage divider circuit can be accomplished in other ways. For instance a variable resistance could be connected in series between the gate terminal and the voltage divider circuit. Also, in a commercial embodiment resistance $R_1$ may take the form of two separate resistors connected in series. In which event tap 29 would be connected to the junction of the two resistors.

If the amplitude of the supply voltage varies and the master controlled rectifier is turned on at the same interval of the pulses the amount of energy provided to the load will vary. For instance, assuming the circuit is set to turn on the controlled rectifiers at the midpoint of each pulse, an increase in the supply voltage level would cause the load to receive more energy while a decrease in the voltage level would cause the load to receive less energy. In a light dimming system this would cause the intensity of the light or the light level to vary from the designed level as the supply voltage varies. The master firing circuit 9 compensates for variations in the supply voltage. As the supply voltage varies, the instantaneous value of the DC pulses which appears between power leads 16–17 also will vary. Since the voltage divider circuit is connected to the intermediate tap of resistance $R_1$ the instantaneous voltage at the programmable unijunction gate 28 follows the variations in the supply voltage. However, since the charging circuit $R_2$, $C_1$, is energized across the Zener diode $Z_1$ the charging voltage for capacitor $C_1$ is constant. Thus, if the supply voltage increases the capacitor $C_1$ will have to charge to a higher voltage level before its voltage, and thus the unijunction anode voltage, reaches the instantaneous gate voltage. This causes the programmable unijunction transistor $Q_1$ to conduct later in the pulse and compensates for the higher supply voltage. Conversely, when the supply voltage drops the unijunction's gate voltage is lower and the capacitor $C_1$ will charge to a lower level before the programmable unijunction begins to conduct. Thus the controlled rectifiers will be fired earlier. This relationship tends to compensate for variations in the supply voltage. The master firing circuit tends to supply the same amount of energy to the load regardless of variations in the supply voltage.

Figure 2:
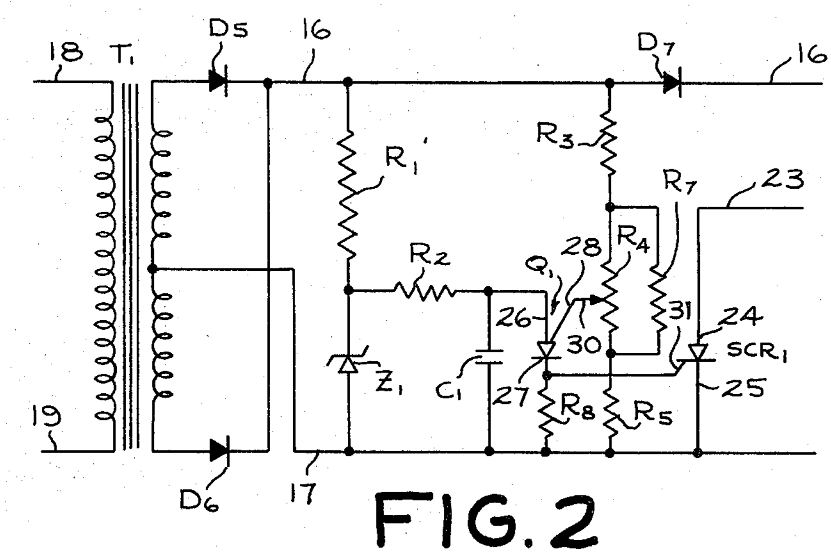
FIG. 2 is a schematic circuit diagram of another form of master firing circuit useful in the firing circuit arrangement of FIG. 1.

In the master firing circuit 9, forming part of the firing circuit arrangement of FIG. 1, the Zener diode $Z_1$ has some regulating effect on the voltage at the intermediate tap 29 of resistance $R_1$. Thus the voltage divider circuit does not completely track the supply voltage. The master firing circuit illustrated in FIG. 2 provides a complete tracking of the supply voltage by the voltage divider network to provide a greater degree of voltage compensation. With reference to FIG. 2, various components are provided with the same reference numbers as the corresponding component on FIG. 1. It will be understood that by corresponding components we mean components which perform essentially the same function even though, because of the slightly different circuit arrangement between the two figures, an individual component may have a somewhat different value. So far as the circuits are concerned there are only two differences between the master firing circuits of FIGS. 1 and 2. First, the resistance $R_1$ in FIG. 2 does not have an intermediate tap. Second, the voltage divider circuit, particularly resistance $R_3$, is connected directly to the supply lead 16 rather than being connected to the supply lead 16 through the resistance $R_1$ $_4$. With this arrangement the master firing circuit of FIG. 2 performs in essentially the same manner as described above for the master firing circuit of FIG. 1. However, the Zener diode $Z_1$ has no regulating effect upon the instantaneous voltage appearing across the voltage divider network and the voltage divider network voltage completely tracks the supply voltage appearing between the power leads 16–17.

With either of the circuits of FIGS. 1 or 2 it is possible for the controlled rectifiers to fire too soon in a pulse if the voltage drops somewhat below the designed supply voltage. In a light diming circuit this could cause light flicker. Such a situation would be most likely to occur when a high light level selection is coupled with a low voltage. When a high light level is selected the intermediate tap 30 is moved to the lower end of the resistance $R_4$. This results in a small percentage of the instantaneous supply voltage being impressed on the gate terminal 28 of the programmable unijunction. If this is coupled with a supply voltage level lower than the designed voltage an even lower instantaneous voltage appears at the programmable unijunction transistor gate terminal 28. Since the Zener diode $Z_1$ regulates the voltage from which capacitor $C_1$ is charged, variations in the supply voltage have essentially no effect on the charging rate of the capacitor $C_1$. The result is that the main controlled rectifier $SCR_1$ will fire at an unusually early interval of the power supply pulses. This can result in the slave controlled rectifiers being first gated in some pulses before they have turned off from the previous pulse. When the load current passes through zero the controlled rectifiers will turn off and may not be triggered again until the very end of these pulses. During these pulses, the lamps will be provided with energy only during the latter portion of such pulses, resulting in lamp flicker.

Figure 3:
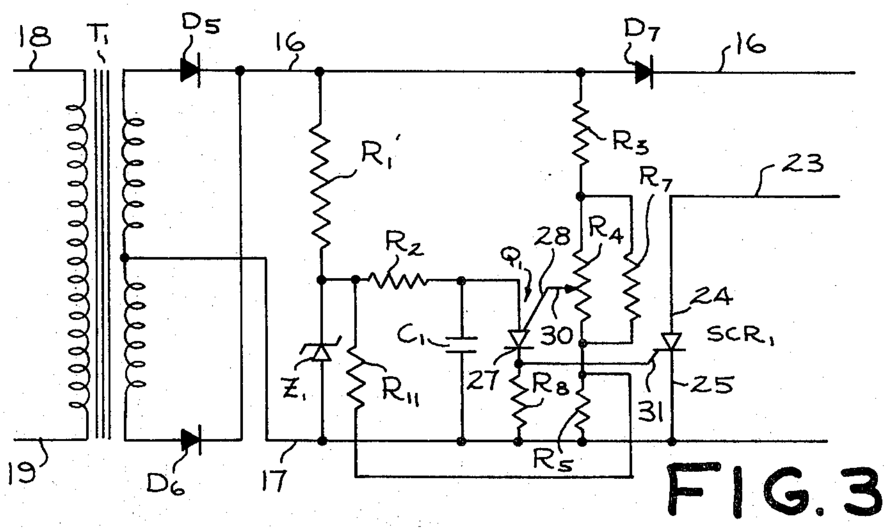
FIG. 3 is still another form of a master firing circuit useful in the firing circuit arrangement of FIG. 1.

The master firing circuit illustrated in FIG. 3 prevents this occurrence. The circuit of FIG. 3 is the same as that of FIG. 2 except that the junction between resistance $R_1$ and Zener diode $Z_1$ is connected to the junction between resistance $R_4$ and resistance $R_5$ through a dropping resistance $R_{11}$. With this circuit the regulated voltage of Zener diode $Z_1$, minus the voltage drop across resistance $R_{11}$, is applied to the junction between resistances $R_4$ and $R_5$. This provides the tap 30 and the programmable unijunction gate terminal 28 with a minimum regulated voltage, regardless of how high the light intensity is set and despite the fact that the supply voltage may drop somewhat below the design voltage. This provides at least a minimum phase angle in each supply pulse before the controlled rectifiers are turned on. This phase angle is sufficient to assure that a lagging current through the load as a result of firing in the previous half cycle has reached zero and the controlled rectifiers have turned off before they are turned on again.

Figure 4:
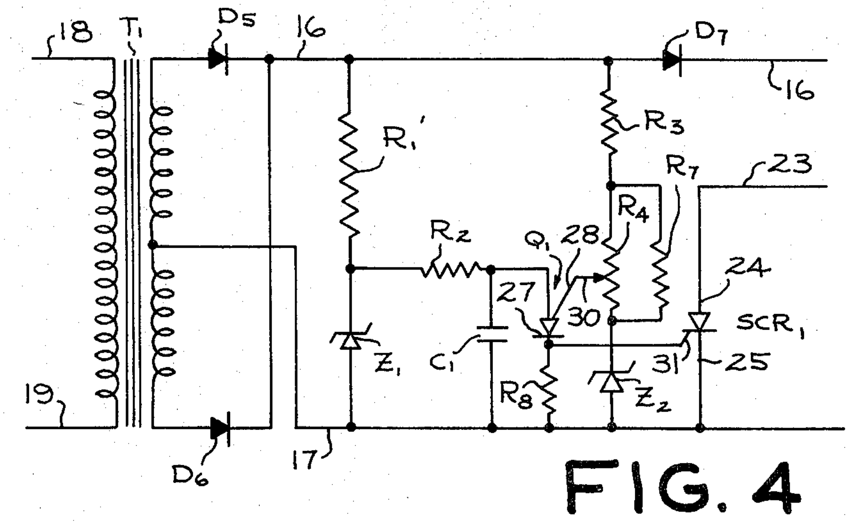
FIG. 4 is yet another form of master firing circuit useful in the firing circuit arrangement of FIG. 1.

Another master firing circuit is shown in FIG. 4, which accomplishes the same purpose in a somewhat different manner. The master firing circuit of FIG. 4 is similar to that of FIG. 2 except that the resistance $R_5$ is replaced by a voltage regulating device such as a Zener diode $Z_2$. The Zener diode $Z_2$ is chosen to have a regulating voltage which is significantly less than that of Zener diode $Z_1$. For instance Zener diode $Z_1$ may have a regulating voltage of 20 volts and Zener diode $Z_2$ may have a regulating voltage of 4 volts. With such an arrangement, regardless of the light intensity selection and despite a supply voltage somewhat less than the designed supply voltage, there always will appear at the programmable unijunction transistor gate 28 a regulated voltage determined by the second Zener diode $Z_2$. This again assures a minimum phase angle of each half cycle of the supply voltage before the controlled rectifiers can be fired.

It will be understood that utilization of a master firing circuit 9 such as that shown in FIGS. 3 and 4 for instance, which provides such as assured minimum phase angle will detract from the voltage compensation or regulation that is available with high power or light intensity selections. However, in fluorescent lamp dimming systems, for instance, the ballast normally used to light the fluorescent lamps provide a sufficiently large impedance as compared to the lamps at high light settings that they provide all the regulation needed. Thus, we are able to provide the desired regulation at low and intermediate light settings without detracting from the operation of high light settings. For instance with an unregulated system such as that shown in FIGS. 1 or 2 there may be as much as a 1,000 percent light change with a 10 percent voltage change whereas with the regulation means as shown in FIGS. 3 or 4 there is about a 20 percent light change for a 10 percent change in supply voltage.

A circuit is set forth in FIG. 1 has been built and operated with components having the following values:

| | |
|---|---|
| Transformer $T_1$ | primary winding 1244 turns of .0071" wire; secondary winding 500 turns of .0080" wire with tap at 250 turns |
| Transformers $T_2$ $T_2'$ and $T_2''$ | primary winding 1000 turns of .0089" wire; secondary winding 1000 turns of .0089" wire; |
| Diodes $D_1$ $D_2$, $D_3$, and $D_4$ | 300 volt, 1.5 amperes (average) |
| Diodes $D_5$, $D_6$, $D_7$ | 150 volt, 300 miliamperes (average) |
| Zener Diode $Z_1$ | 10 volts, 1 watt |
| Resistor $R_1$ | 1 kilohms, 1 watt (variable) |
| Resistor $R_2$ | 33 kilohms, ½ watt |
| Resistor $R_3$ | 2.7 kilohms, ½ watt |
| Resistor $R_4$ | 2 kilohms, 2 watt potentiometer |
| Resistor $R_5$ | 2.2 kilohms, ½ watt |
| Resistor $R_7$ | 33 kilohms, ½ watt |

| | |
|---|---|
| Resistor $R_8$ | 47 ohms, ½ watt |
| Capacitor $C_1$ | 0.2 microfarads, 20 volts |
| Programmable Unijunction Transistor $Q_1$ | D13 T1 |
| Silicon Controlled Rectifiers $SCR_1$, $SCR_2$, $SCR_3$, $SCR_4$. | 300 volts, 4 amperes (average) |
| Capacitors $C_2$, $C_2'$, $C_2''$. | 0.0068 microfarads |
| Resistors $R_9$, $R_9'$, $R_9''$ | 6.8 kilohms, ½ watt |
| Resistors $R_{10}$, $R_{10}'$, $R_{10}''$ | 1 kilohms, ½ watt |

From the foregoing description of various embodiments of our invention, it will be apparent that many modifications may be made therein. It will be understood, however, that these embodiments of the invention are intended as exemplifications of the invention only and that the invention is not limited thereto. For instance in the exemplification circuits the master and slave switch means are shown as controlled rectifiers. Other switch means can be employed, for instance other thyristors, such as triacs, could be employed. It is to be understood, therefore, that we intend in the appended claims to cover all such modifications as fall within the true spirit and scope of the invention.

We claim:

1. A voltage compensated circuit for operating at least one solid state switch means from a cyclically varying potential source, including:

a. at least one solid state switch means having a control terminal;

b. a first voltage regulating device connected in circuit across the potential source so that a regulated D.C. potential appears across said first voltage regulating device;

c. a resistance-capacitance charging circuit connected across said first voltage regulating device;

d. a programmable unijunction transistor having an anode terminal, a cathode terminal and a gate terminal; said anode terminal being connected to said charging circuit for providing said programmable unijunction with anode voltage;

e. a voltage divider circuit connected to the potential source; said programmable unijunction gate terminal having a selectively variable connection to said voltage divider circuit for controlling the gate voltage of said programmable unijunction;

f. means for providing said programmable unijunction gate terminal with a regulated voltage;

g. said control terminal of said at least one solid state switch means being connected in circuit with said programmable unijunction cathode terminal for providing a control signal to said at least one solid state switch means upon conduction of said programmable unijunction.

2. A voltage compensated circuit as set forth in claim 1, wherein said first voltage regulating device is connected across the potential source in series with a first dropping resistance; said first dropping resistance having an intermediate tap; and said voltage divider circuit is connected to the potential source through said intermediate tap.

3. A voltage compensated circuit as set forth in claim 1, wherein said voltage divider circuit is connected to the potential source independently of said first voltage regulating device.

4. A voltage compensated circuit as set forth in claim 1, wherein said voltage divider circuit is connected to said first voltage regulating device through a second dropping resistance for providing said programmable unijunction gate terminal with a regulated voltage.

5. A voltage compensated circuit as set forth in claim 1 wherein said voltage divider circuit includes a second voltage regulating device having a lower regulating voltage than that of said first voltage regulating device, said second voltage regulating device providing said programmable unijunction gate terminal with a regulated voltage.

6. A voltage compensated circuit for firing at least one thyristor, comprising:

a. at least one thyristor having a control terminal;

b. input means for providing a pulsating D.C. potential;

c. a first Zener diode connected in circuit across said input means in circuit with a first dropping resistance having an intermediate tap so that a regulated D.C. potential appears across said first Zener diode;

d. a resistance-capacitance charging circuit connected across said first Zener diode;

e. a programmable unijunction transistor having an anode terminal, a gate terminal and a cathode terminal; said anode terminal being connected to said charging circuit for providing said programmable unijunction with anode voltage;

f. a voltage divider circuit connected across said input means through said intermediate tap of said first dropping resistance; said gate terminal of said programmable unijunction having a selectively variable connection to said voltage divider circuit for controlling the gate voltage of said programmable unijunction;

g. said control terminal of said thyristor being connected in circuit with said programmable unijunction cathode terminal for providing a firing signal to said thyristor upon conduction of said programmable unijunction.

7. A voltage compensated circuit as set forth in claim 6, further comprising means for providing said programmable unijunction gate terminal with a regulated voltage.

8. A voltage compensated circuit as set forth in claim 6 wherein said voltage divider circuit is connected to said first Zener diode through a second dropping resistance for providing said programmable unijunction gate terminal with a regulated voltage less than the regulating voltage of said first Zener diode.

9. A voltage compensated circuit as set forth in claim 6 wherein said voltage divider circuit includes a second Zener diode having a lower regulating voltage than that of said first Zener diode, said second Zener diode providing said programmable unijunction gate terminal with a regulated voltage.

10. A voltage compensated firing circuit for firing a plurality of thyristors, said firing circuit comprising:

a. input means for providing a pulsating potential;

b. a master thyristor and a plurality of slave thyristors;

c. a plurality of auxiliary firing circuits; each of said auxiliary firing circuits including said at least one slave thyristor and at least one storage capacitor, means coupling each of said storage capacitors to its associated at least one slave thyristor for firing said at least one slave thyristor when said storage capacitor is discharged, and circuit means connecting each of said storage capacitors to said input means to provide each of said storage capacitors with a charge and connecting each of said storage capacitors in circuit across said master thyristor to provide a discharge path for each of said storage capacitors upon firing of said master thyristor.

d. a programmable unijunction transistor; said programmable unijunction having an anode terminal, a cathode terminal and a gate terminal;

e. a voltage divider circuit connected to said input means; said programmable unijunction gate terminal having a selectively variable connection to said voltage divider circuit for controlling the gate voltage of said programmable unijunction;

f. a first voltage regulating device connected across said input means for providing a regulated D.C. voltage across said first voltage regulating device;

g. a resistance-capacitance charging circuit connected across said first voltage regulating device, said programmable unijunction anode terminal being connected to said charging circuit for providing said programmable unijunction with anode voltage;

h. said master thyristor having a control terminal connected in circuit with said programmable unijunction cathode terminal for firing said master thyristor upon conduction of said programmable unijunction.

11. A voltage compensated firing circuit as set forth in claim 10, wherein said first voltage regulating device is connected across said input means in series with a first dropping resistance, said first dropping resistance having an intermediate tap, and said voltage divider circuit is connected to said input means through said intermediate tap.

12. A voltage compensated circuit as set forth in claim 11, wherein said voltage divider circuit is connected to said first voltage regulating device through a second dropping resistance for providing said programmable unijunction gate terminal with a regulated voltage less than the regulating voltage of said first voltage regulating device.

13. A voltage compensated circuit as set forth in claim 12, wherein said voltage divider circuit includes a second voltage regulating device having a lower regulating voltage than that of said first voltage regulating device; said second voltage regulating device providing said programmable unijunction gate terminal with a regulated voltage.

14. A voltage compensated circuit as set forth in claim 12, wherein said voltage divider circuit is connected to said input means independent of said first voltage regulating device.

* * * * *